B. REIVER.
MEANS FOR LOADING SHIPS.
APPLICATION FILED MAR. 21, 1911.
1,063,832.
Patented June 3, 1913.
3 SHEETS—SHEET 1.
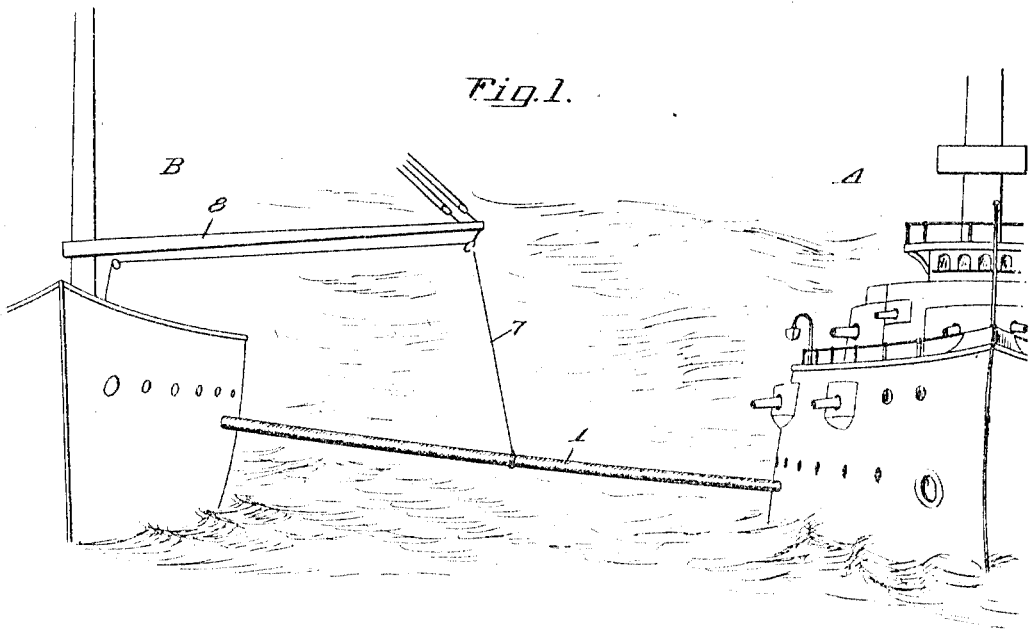
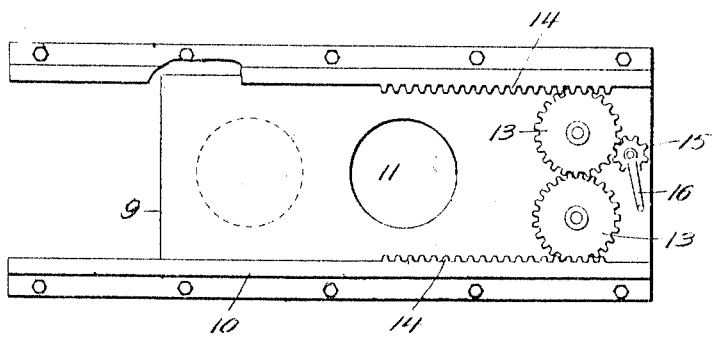
Witnesses
F. L. Gilson.
U. B. Hillyard.
Inventor
Bernard Reiver:
By Victor J. Evans
Attorney

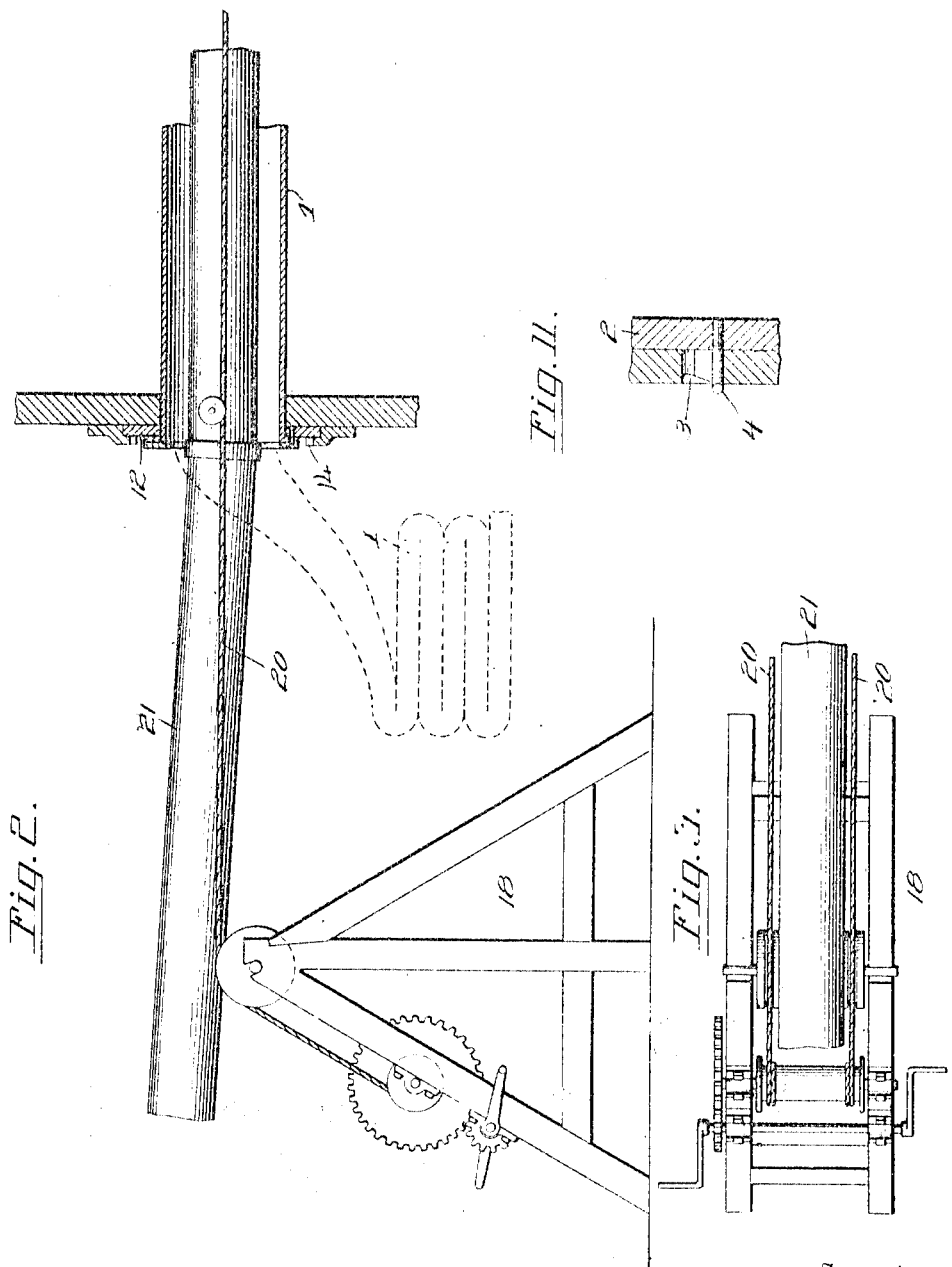

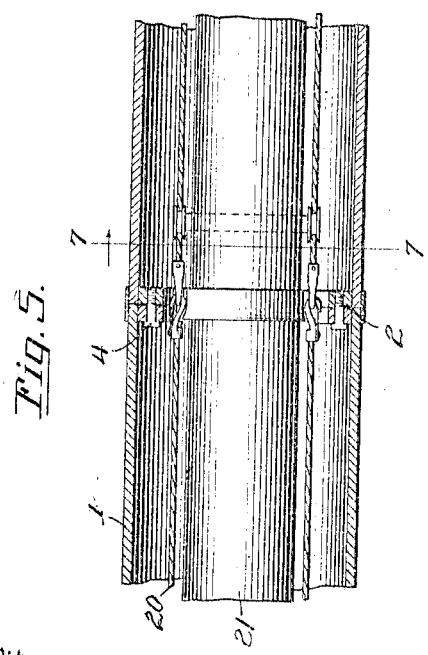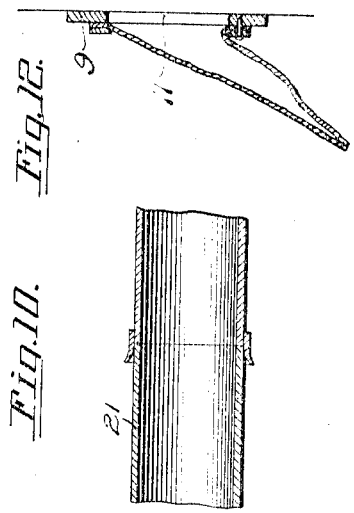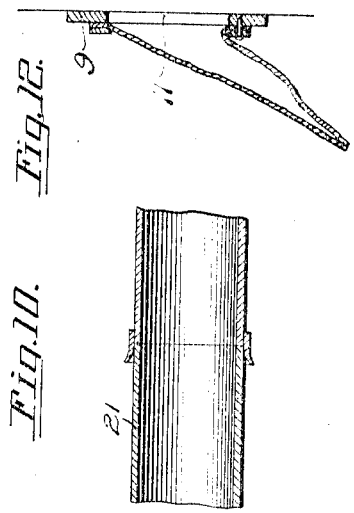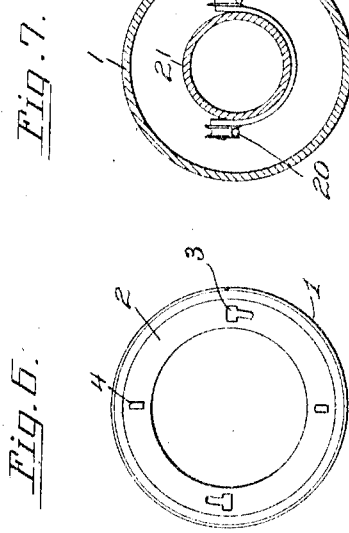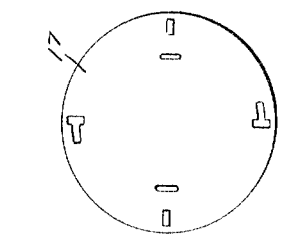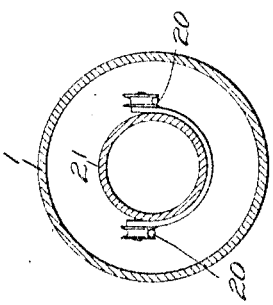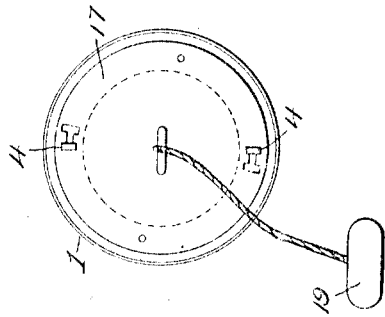

UNITED STATES PATENT OFFICE.

BERNARD REIVER, OF PHILADELPHIA, PENNSYLVANIA.

MEANS FOR LOADING SHIPS.

1,063,832.  Specification of Letters Patent. Patented June 3, 1913.

Application filed March 21, 1911. Serial No. 615,639.

*To all whom it may concern:*

Be it known that I, BERNARD REIVER, a citizen of Roumania, residing at Philadelphia, in the county of Philadelphia and State of Pennsylvania, have invented new and useful Improvements in Means for Loading Ships, of which the following is a specification.

The present invention provides apparatus designed chiefly for coaling ships at sea, but which may be employed for loading and unloading ships with various commodities either upon the high seas or in port.

In accordance with this invention a tube connects the two vessels, the one to be loaded and the one from which the load is to be discharged, said tube comprising sections which are insertible through openings formed in the sides of the vessels, said openings being closed by plates in which are formed openings to register with the openings in the sides of the vessels to admit of the tube passing therethrough.

The invention further contemplates novel means for connecting the sections of the tube and peculiar and positive means for moving the plates, whereby the operation may be expeditiously and conveniently performed.

The invention further contemplates a second tube arranged within the outer tube and protected thereby, said second tube constituting the duct or carrier through which the commodity is transferred from one vessel to the other during the operation of loading or unloading.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a detail view, showing two vessels connected by means embodying the invention whereby the loading or unloading is effected. Fig. 2 is a side view of the unloading means applied to one of the vessels. Fig. 3 is a top plan view of the windlass and part of the load carrying tube. Fig. 4 is a view in elevation of the plate for closing the opening in the side of the vessel through which the tube passes. Fig. 5 is a detail view of the jointed ends of the two tubes and the connecting cables. Fig. 6 is an end view of the outer tube. Fig. 7 is a section on the line 7—7 of Fig. 5. Fig. 8 is an end view of the outer tube with the stopper in place. Fig. 9 is a detail view of a stopper for closing the outer ends of the tube sections to prevent the inrush of water therethrough. Fig. 10 is a detail view of the mating ends of the inner or load-carrying tube. Fig. 11 is a detail view of the joint formed between the sections of the outer tube. Fig. 12 is a sectional view, showing more clearly the manner of connecting the flexible or protective tube to the plate.

Corresponding and like parts are referred to in the following description, and indicated in all the views of the drawings, by the same reference characters.

A and B indicate two vessels, the one to be loaded and the other to be unloaded. In the present instance the vessel A designates a ship to be coaled and B a collier or barge carrying the coal to be loaded upon the vessel A. Openings are formed in the sides of the two vessels and receive the end portions of a tube 1, which passes through the openings and has a water tight joint therewith. The tube 1 is composed of a number of sections which are flanged at their ends to strengthen the joint and to provide for reception of the fastening means whereby the sections are made secure when fitted together. The flanges at the meeting ends of the tube sections are indicated at 2 and are provided with complemental securing means consisting of openings 3 and studs 4, the latter being adapted to pass through the openings 3 and to draw the sections together upon relatively turning the same. The flanges 2 fit closely so as to exclude water and if found necessary packing may be interposed between the flanges or abutting ends of the sections to insure the formation of a water tight joint. A cable 7 is attached to an arm 8 mounted upon one of the vessels, and serves as supporting means for sustaining the tube at a point between the vessels.

A plate 9 is slidably mounted in ways 10 located upon the inner side of the hull of the vessel and this plate has an opening 11 to register with the openings in the side of the vessel through which the tube 1 passes. A flange or rim 12 surrounds the opening 11 and receives the tube 1 and insures the formation of a tight joint between the tube and plate. Packing of any nature may be fitted to the flange or rim 12 to assure the formation of a water tight joint, which is essential. Two cog wheels 13 are mounted upon the plate 9 and their teeth intermesh and also mesh with cog teeth 14 formed upon the guides 10. A pinion 15 meshes with one of the cog wheels 13 and is adapted to be operated by means of a crank 16 to rotate the cog wheels 13 and effect a sliding movement of the plate 9 either to uncover or to cover the opening in the side of the vessel. The plate 9 is adapted to fit close against the inner side of the vessel to prevent the entrance of any water through the opening designed to receive the tube 1.

A stopper 17 closes the outer ends of the sections of the tube 1 to prevent water entering the same when the sections are projected and during the time of coupling and uncoupling. Suitable fastenings are employed for retaining the stoppers 17 in place, said fastenings preferably consisting of the studs 4. Each of the stoppers has a float 19 connected therewith. Before coupling the sections of the tube 1 the stoppers 17 are removed, thereby establishing an unobstructed passage between the two vessels through the tube 1. Cables 20 pass through the tube 1 and are anchored or made fast at their ends to the vessels by windlasses 18. The cables sustain the strain and serve as means for lashing the two vessels, thereby relieving the tube of such strain and preventing said tube from pulling apart.

A second tube 21 passes through the tube 1 and is supported by means of the cables 20. The tube 21 constitutes a duct, carrier or passage through which the commodity is transferred from one vessel to the other, any suitable means being employed for effecting the transfer of the load. The tube 21 is preferably formed of sections which may be connected by a slip joint or in any desired way.

When it is required to load or unload a vessel embodying the invention the plate 9 is moved to a position to bring the opening therein in register with the opening in the side of the vessel, after which the tube 1 is projected through the openings. To prevent water entering the end of the tube 1 the stopper 17 is secured in place. The tube 1 is waterproof and preferably of flexible material such as canvas. After the end of the tube has been projected a boat is lowered from the vessel and the end of the tube is drawn toward the boat by means of the float and the table attached thereto. The two ends of the tubes 1 from the two vessels, the one to be loaded and the one to be unloaded, are brought together and the stoppers 17 removed and the cables 20 which are attached to said stoppers are disconnected therefrom and coupled preliminary to connecting the ends of the tubes. After the cables and tubes 1 have been coupled the cables 20 are tightened, after which the load carrying tube 21 is passed through the waterproof tube 1, the load being transferred through the tube 21 in any manner. The terminal portions of the load carrying tube may be adapted to receive the load from any part of one vessel and to discharge the same into bins or other parts of the other vessel.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

As indicated most clearly in Fig. 12 one end of the tube 1 is secured to the plate 9 in line with the opening 11. When the plate is moved to the position indicated in Fig. 4 the tube 1 may be folded, rolled, or permitted to lie loose within the vessel. After the plate 9 has been moved to bring the openings in register the tube 1 is pushed through said openings in the plate and side of the vessel.

Having thus described the invention what is claimed as new, is:—

1. In means for loading and unloading vessels, a tube connecting two vessels, a lashing cable for connecting the two vessels passing through the tube, and a second tube arranged within the first mentioned tube and adapted to have the load passed therethrough 2. In means for loading and unloading vessels, a tube connecting two vessels, a lashing cable for connecting the two vessels passing through the tube, and a second tube arranged within the first mentioned tube and adapted to have the load passed therethrough, said second tube being supported within the first mentioned tube by means of the lashing cable.

In testimony whereof I affix my signature in presence of two witnesses.

BERNARD REIVER.

Witnesses:
Wm. A. Brogan,
Millard P. Sayles.